United States Patent
Fujita et al.

[11] Patent Number: 6,161,863
[45] Date of Patent: Dec. 19, 2000

[54] AIR BAG DEVICE

[75] Inventors: Yoshiyuki Fujita, Nagoya; Yohei Fukasawa, Kuwana, both of Japan

[73] Assignee: Toyoda Gosei Co., Ltd., Aichi-Ken, Japan

[21] Appl. No.: 09/131,508

[22] Filed: Aug. 10, 1998

Related U.S. Application Data

[63] Continuation-in-part of application No. 08/906,827, Aug. 6, 1997.

[30] Foreign Application Priority Data

Aug. 6, 1996 [JP] Japan .................................. 8-207344

[51] Int. Cl.$^7$ .................................................. B60R 21/16
[52] U.S. Cl. ...................................... 280/728.2; 280/731
[58] Field of Search .............................. 280/728.1, 728.2, 280/728.3, 731

[56] References Cited

U.S. PATENT DOCUMENTS

| | | | |
|---|---|---|---|
| 5,228,362 | 7/1993 | Chen et al. . | |
| 5,280,946 | 1/1994 | Adams et al. | 280/728.2 |
| 5,356,173 | 10/1994 | Hongou et al. | 280/728.2 |
| 5,368,327 | 11/1994 | Shiraki et al. | 280/731 X |
| 5,435,593 | 7/1995 | Hiramitsu et al. | 280/728.2 |
| 5,508,482 | 4/1996 | Martin et al. . | |
| 5,630,612 | 5/1997 | Yamamoto et al. | 280/728.2 |
| 5,826,901 | 10/1998 | Adomeit | 280/728.2 |

FOREIGN PATENT DOCUMENTS

| | | |
|---|---|---|
| 5-139236 | 6/1993 | Japan . |
| 7-125596 | 5/1995 | Japan . |
| 2 270 657 | 3/1994 | United Kingdom . |

OTHER PUBLICATIONS

Patent Abstracts of Japan, Pub. No. 07017407, Pub. Date Jan. 20, 1995, K. Yamamoto, "Fitting Structure of Horn Pad of Steering Wheel,".

*Primary Examiner*—Paul N. Dickson
*Assistant Examiner*—F. Zeender
*Attorney, Agent, or Firm*—Pillsbury Madison & Sutro LLP

[57] ABSTRACT

An air bag device including a pad made of a synthetic resin and a bag holder consisting of metal. The pad includes a top wall that covers an air bag and includes extending doors, which are adapted to be broken when the air bag expands. The top wall also includes a unitary mounting wall extending downwardly from the outer peripheral edge of the top wall. The bag holder includes a bottom wall for holding the air bag and a side wall extending vertically from the outer peripheral edge of the bottom wall. The unitary mounting wall includes mounting holes extending horizontally in the inner side surface above the mounting holes. The side wall includes mounting holes extending therethrough to correspond to the mounting holes of the mounting wall and retaining pawls arranged at a location extending upwardly from the bottom wall. The retaining pawls are capable of being retained on the peripheral edges of the retaining grooves. The pad is held in the bag holder by retaining grooves and by inserting an attachment device into the mounting holes of the unitary mounting wall portion and the side wall to securely fasten the unitary mounting wall and the side wall.

9 Claims, 13 Drawing Sheets

AIR BAG DEVICE

This is a Continuation-in-Part of: National Appln. Ser. No. 08/906,827 filed Aug. 6, 1997.

BACKGROUND OF THE INVENTION (1) Field of the Invention

The present invention relates to an air bag device which is mounted on a vehicle. More specifically, the invention relates to an improvement in a construction for holding a pad in a bag holder. The pad covers a folded air bag.

(2) Description of the Prior Art

In the air bag device of the prior art, the folded air bag is covered with the pad. This pad is made of a synthetic resin and constructed to include a ceiling wall portion and a mounting wall portion. The ceiling wall portion is provided with a door portion. This door portion is opened by breaking its surroundings when the air bag expands. The mounting wall portion extends downwards from the outer peripheral edge of the ceiling wall portion.

Moreover, the air bag device is equipped with a bag holder for holding the air bag and the pad. The bag holder is made of a sheet metal, and is constructed to include a bottom wall portion and a side wall portion. The bottom wall portion is arranged under the ceiling wall portion so as to confront the ceiling wall portion of the pad. The bottom wall portion is constructed to hold the air bag on its upper face side. The side wall portion is extended vertically from the outer peripheral edge of the bottom wall portion. On the other hand, the side wall portion is arranged with the inner side of the mounting wall portion of the pad. This side wall portion holds the pad.

Moreover, two model types are provided in the prior art for holding of the pad by the bag holder.

First, one type is called the "clamping type" (as disclosed in Unexamined Published Japanese Patent Application No. 5-139236). The pad is provided, in the inner side face of the mounting wall portion, with retaining grooves which are extended horizontally. The pad is further provided with inserting grooves in the lower end face of the mounting wall portion. The bag holder is provided with retaining pawls at the upper end of the side wall portion. Below the bag holder, there is arranged a back-up plate which is connected to the bag holder. The back-up plate is provided with a vertical wall extended upward. For holding the pad, moreover, the retaining pawls of the bag holder are retained at first in the retaining grooves of the pad. Next, the vertical wall of the back-up plate is inserted from below the holder into an insertion groove of the pad. As a result, the lower portion of the pad is clamped between the retaining pawls and the vertical wall of the back-up plate so that the pad is held by the bag holder.

The other type is called the "rivet type" (as disclosed in Unexamined Published Japanese Patent Application No. 7-125596). The mounting wall portion of the pad and the side wall portion of the bag holder are individually provided at their corresponding positions with mounting holes extended therethrough. Moreover, the pad is held by inserting fixing means such as rivets into these mounting holes.

However, the former clamping type requires the back-up plate. This back-up plate is made of a sheet metal. This increases the weight of the air bag device of the clamping type.

On the other hand, the latter rivet type employs a doubling plate made of a sheet metal. This doubling plate is arranged on the peripheral edge of the fixing means on the outer side face side of the pad mounting wall portion. This doubling plate also increases the weight of the air bag device of the rivet type.

SUMMARY OF THE INVENTION

An object of the invention is to solve the above-specified problems. An object of the invention is to provide an air bag device which can provide a decrease in weight and an increase in internal space without a reduction in the holding force of the pad by the bag holder.

According to the invention, there is provided an air bag device comprising:

a pad made of a synthetic resin and including: a ceiling wall portion covering a folded air bag and adapted to be broken, when said air bag expands, for extending a door portion; and a mounting wall portion extended downward from the outer peripheral edge of said ceiling wall portion; and a bag holder made of a metal and including: a bottom wall portion arranged under said ceiling wall portion to confront said ceiling wall portion, and holding said air bag on its upper face side; and a side wall portion extended vertically from the outer peripheral edge of said bottom wall portion and arranged in said mounting wall portion for holding said pad. The air bag device is characterized:

in that said mounting wall portion includes: mounting holes extended horizontally therethrough; and retaining grooves arranged horizontally in the inner side faces above said mounting holes;

in that said side wall portion includes: mounting holes extended through to correspond to the mounting holes of said mounting wall portion; and retaining pawls arranged at the portions extended upwards from said bottom wall portion, and capable of being retained on the peripheral edges of said retaining grooves; and in that said pad is held in said bag holder by retaining said retaining pawls on the peripheral edges of said retaining grooves, and by inserting fixing means into the mounting holes of said mounting wall portion and said side wall portion to fasten said mounting wall portion and said side wall portion.

Moreover, it is desired that the inner edges of said retaining grooves have ridges protruded upwards, and that the leading ends of said retaining pawls be retained over said ridges on the inner peripheral faces of said retaining grooves.

It is further desired that the side wall portions of said bag holder be provided with portions having a U-shaped section extended downwards from the outer peripheral edges of said bottom wall portion and then upwards, such that said mounting holes are formed in the outer side wall portions of said U-shaped portions below said bottom wall portion. In this case, moreover, it is desired that the inner side wall portions of said U-shaped portions be provided, on the extensions of said mounting holes, with through holes for preventing interference with said fixing means.

It is desired that said fixing means include blind rivets to be fastened from the outer side face of said pad mounting wall portion.

Here in the present specification, the "vertical direction" means the direction in which the ceiling wall portion of the pad and the bottom wall portion of the bag holder confront each other, and the "horizontal direction" means the direction which is perpendicular to the confrontational direction of the ceiling wall portion of the pad and the bottom wall portion of the bag holder.

In the air bag device according to the invention, the retaining pawls of the bag holder side wall portion are retained on the peripheral edges of the retaining grooves of the pad mounting wall portion. Moreover, the fixing means are inserted as the fixing means into the mounting holes of the pad mounting wall portion and the back holder side wall portion thereby to fasten the pad mounting wall portion and the bag holder side wall portion. By these structures, the pad is held in the bag holder.

In the air bag device according to the invention, more specifically, the pad is held in the bag holder by using the clamping type and the rivet type together. The air bag device according to the invention is equipped with the fixing means in addition to the components of the clamping type. However, the air bag device is made to be lighter because the back-up plate can be omitted. As compared with the rivet type, on the other hand, the air bag device of the first embodiment can omit the doubling plate and thereby reduce the number of the fixing means. As a result, the air bag device can be made to be lighter than the rivet type. Moreover, the pad is naturally held in the bag holder by retaining the peripheral edges of the retaining grooves by the retaining pawls, and by fastening the mounting wall portion and the side wall portion with the fixing means. As a result, the holding force of the pad by the bag holder can be prevented from reducing in force by suitably setting the portions to be retained and the portions to be fastened at closer positions.

As for the internal space, on the other hand, the following actions and effects can be achieved. As compared with the clamping type, the present invention can also simultaneously use the fastening of the fixing means. As a result, no trouble occurs even if the strength of the retaining pawls to be retained on the peripheral edges of the retaining grooves is reduced. As a result, it is possible to make the retaining pawls thinner, and to reduce the thickness of the back holder side wall portion. It is further possible to reduce the number of the fixing means, as compared with the rivet type. This makes it possible to enlarge the internal space of the bag holder side wall portion. As a result, it is possible to fold and accommodate even a bulky air bag easily.

Thus, the air bag device according to the invention can be made lighter and larger in its internal space without lowering the holding force of the pad by the bag holder.

As compared with the rivet type, on the inner side face of the bag mounting wall portion above the arranging portion of the fixing means, there is arranged the metallic bag holder side wall portion having the retaining pawls.

Thus, the pressure at the time of expansion of the air bag can be introduced more smoothly to the side of the ceiling wall portion by the metallic bag holder upper side wall portion. As a result, it is possible to improve the performance of extension of the door portions of the pad ceiling wall portion.

Moreover, the ridges, as protruding upwards, are formed on the inner edges of the retaining grooves, and the leading ends of the retaining pawls are retained over the ridges of the inner peripheries of the retaining grooves. Thus, the following actions and effects can be achieved.

At the time of expansion of the air bag, the bulging of the pad mounting wall portion of a synthetic resin over the bag holder side wall portion can be prevented by the retentions of the ridges of the retaining pawls. Therefore, the activating pressure at the time of expansion of the air bag can be smoothly introduced to the ceiling wall portion. As a result, the performance of extensing of the door portions of the pad ceiling wall portion can be further improved.

Moreover, the side wall portion of the bag holder is provided with the portion having the U-shaped section, which is extended downwards from the outer peripheral edge of the bottom wall portion and then upwards, and the outer side wall portion of the U-shaped portion is provided with the mounting holes below the bottom wall portion. Thus, the following actions and effects can be achieved.

Specifically, the bag holder holds the air bag on the upper face side of the bottom wall portion. Moreover, the fixing means are arranged in the grooved U-shaped portion below the bag holder bottom wall portion. This arrangement can prevent the folded air bag from being nipped by the fixing means when the fixing means are fastened.

With this construction, moreover, the inner side wall portions of the U-shaped portion are provided with the through holes on the extensions of the mounting holes for preventing interference with the fixing means. Thus, the following actions and effects can be achieved.

This structure can further reduce the width of the groove-shaped U-shaped portion. Thus, the folded air bag can be made such that it is difficult for it to enter the U-shaped portion. As a result, the air bag can be further prevented from being nipped by the fixing means being fastened.

On the other hand, the fixing means may be embodied by the blind rivets which can be fastened from the outer side face side of the pad mounting wall portion. Thus, the following actions and effects can be achieved.

According to this structure, the fixing means provides no larger protrusion on the inner periphery of the bag holder side wall portion than the fixing means employing the bolts and nuts. Thus, it is possible to provide a larger inner space for the bag holder side wall portion. As a result, it is possible to fold and accommodate even a bulky air bag easily. On the other hand, the air bag can be prevented from being damaged even if it interferes with the air bag.

DESCRIPTION OF THE PREFERRED EMBODIMENT

The invention will be described in connection with its embodiments with reference to the accompanying drawings. However, the invention should not be limited to the embodiments. All modifications in the definitions of Claims or equivalents to the definitions should be contained within the scope of Claims.

Figure 1:
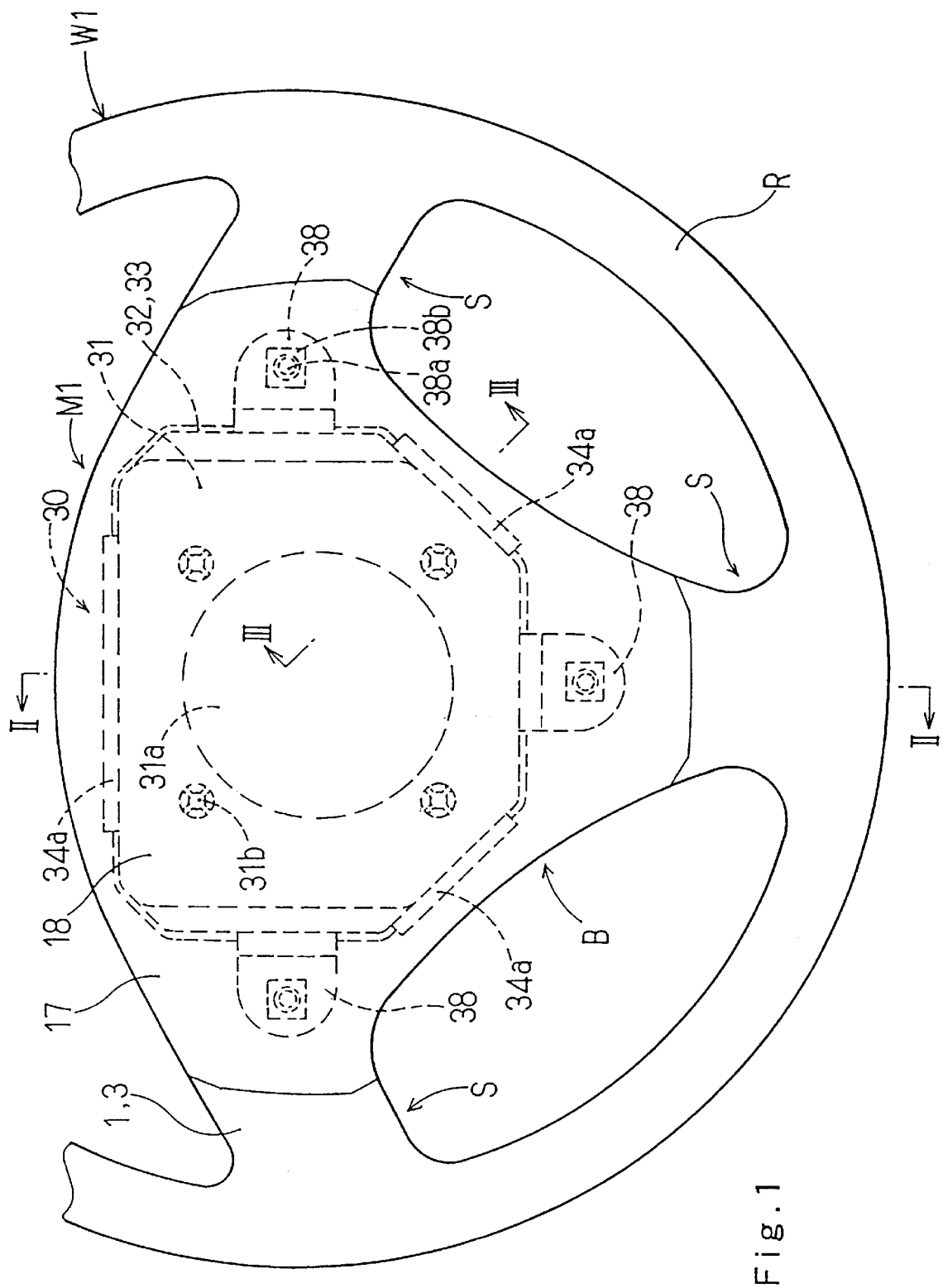
FIG. 1 is a top plan view showing a state of usage of an air bag device of a first embodiment of the invention.
Figure 2:
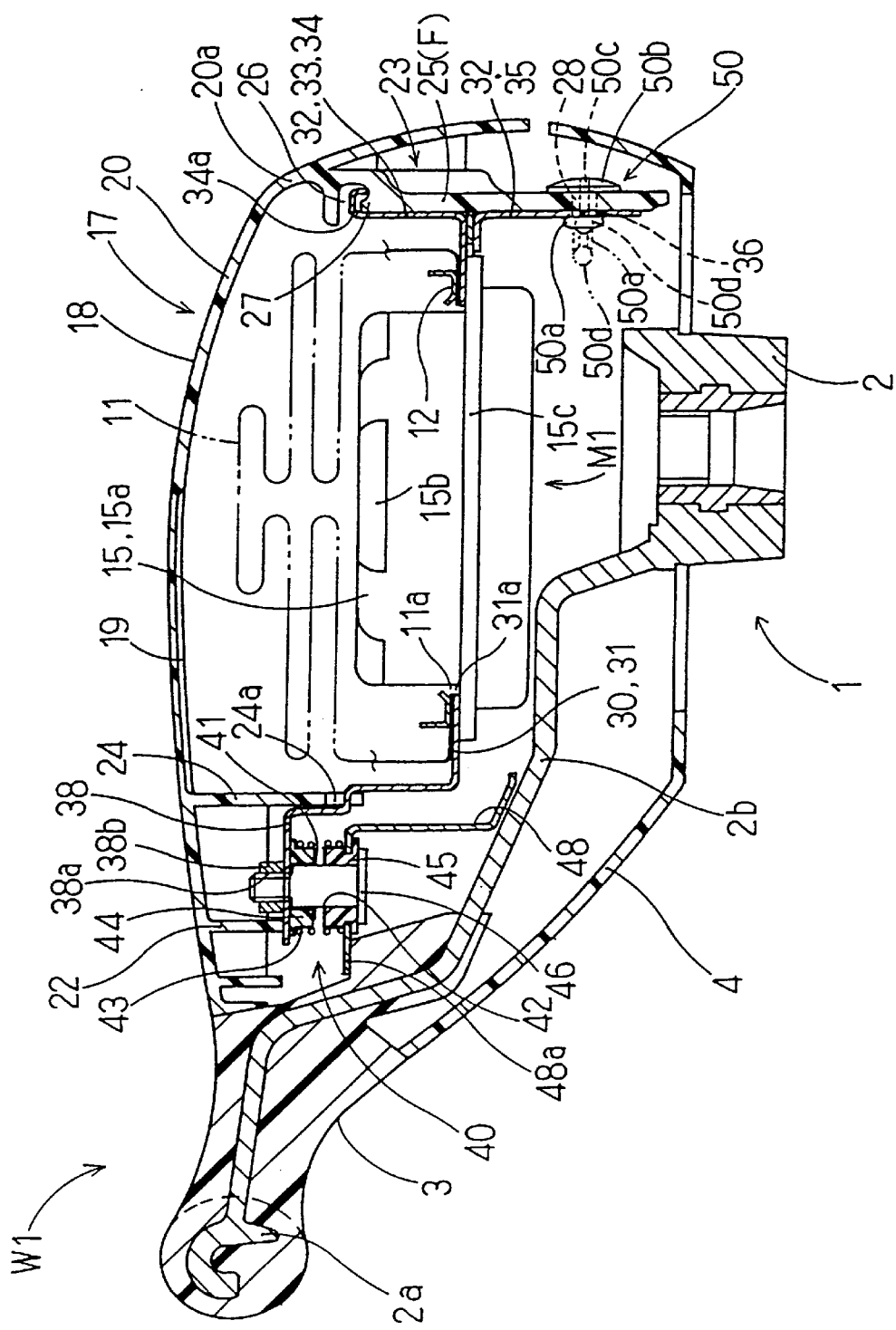
FIG. 2 is a section taken along line II—II of FIG. 1.

An air bag device M1 of a first embodiment is arranged in a steering wheel W1, as shown in FIGS. 1 and 2. This steering wheel W1 is constructed of a ring portion R, a boss portion B and a spoke portion S. The ring portion R is formed into an annular shape to be gripped at the time of steering. The boss portion B is arranged at the center of the ring portion R. The spoke portion S is composed of three portions jointing the ring portion R and the boss portion B individually. The air bag device M1 is arranged over the boss portion B. Here, the steering wheel W1 is constructed of the air bag device M1 and a steering wheel body 1. This steering wheel body 1 is composed of a core 2, a cover layer 3, and a lower cover 4. The core 2 is arranged to extend through the ring portion R, the boss portion B and the spoke portion S. The cover layer 3 covers the ring portion core 2a of the core 2 and the portion of a spoke portion core 2b on the side of the ring portion R. The lower cover 4 is arranged below the boss portion B.

The air bag device M1 is comprised, as shown in FIGS. 1 to 4, of an air bag 11, an inflator 15, a pad 17, a bag holder 30 and a support plate 48. The air bag 11 is accommodated in a folded state. The inflator 15 feeds the air bag 11 with an inflating gas. The pad 17 covers the folded air bag 11. The bag holder 30 holds the air bag 11, the inflator 15 and the pad 17. The support plate 48 is connected to the bag holder 30. Horn switches 40 are arranged between the support plate 48 and the bag holder 30. Further, the support plate 48 is connected to the steering wheel body 1.

Figure 4:
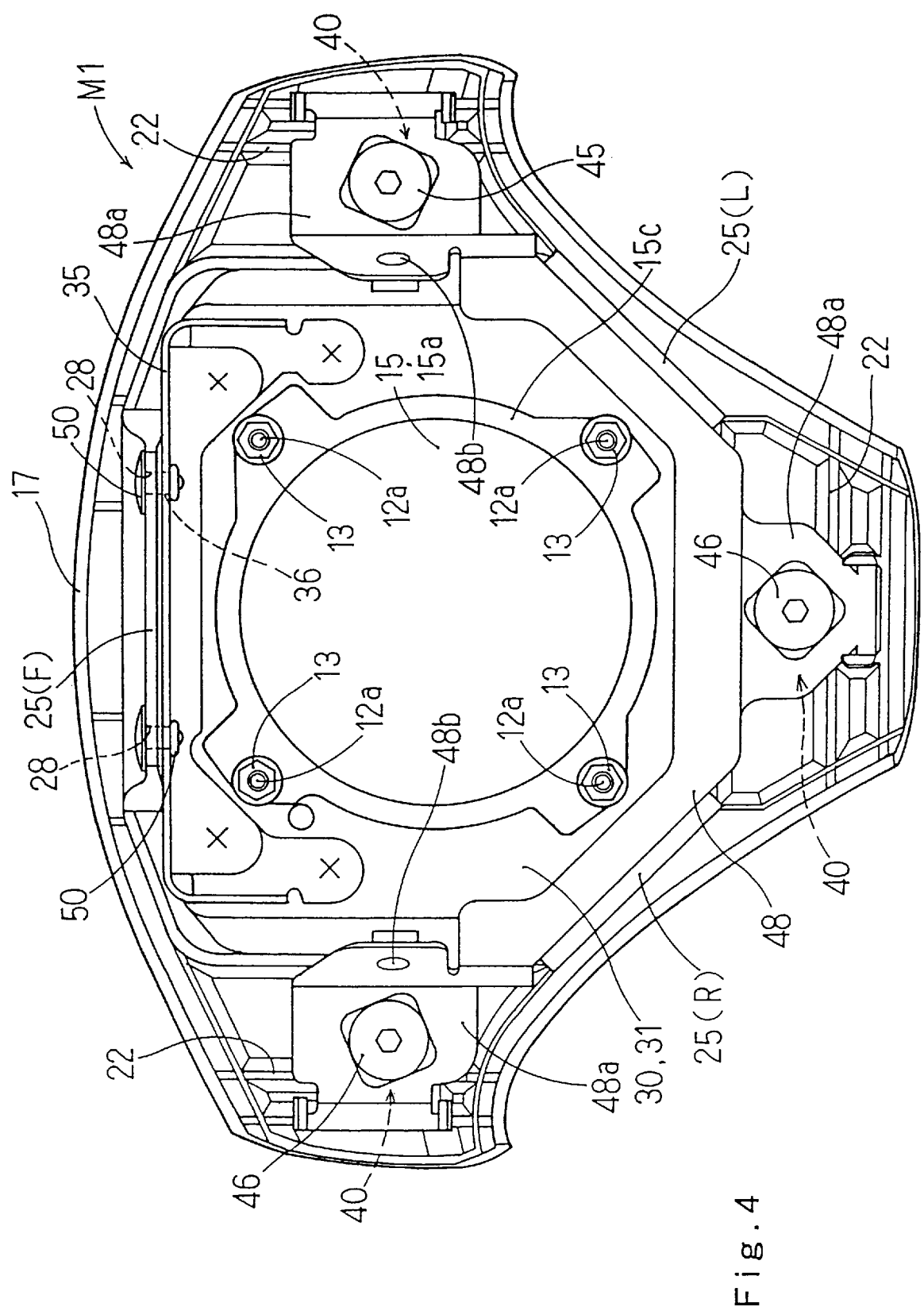
FIG. 4 is a bottom view of the air bag device of the embodiment.

The air bag 11 is provided at its lower portion with an opening 11a which is formed into a circular shape. The air bag 11 is retained in the bag holder 30 by making use of an annular retainer 12. This retainer 12 is equipped with bolts 12a (as shown in FIG. 4). These bolts 12a are inserted through the circumferential edge of the opening 11a, the later-described through holes 31b of the bag holder 30, and a flanged portion 15c of the inflator 15, and are fastened by nuts 13. The air bag 11 and so on are held onto the bag holder 30 by making use of these above-described bolts 12a and nuts 13.

The inflator 15 is comprised of a body portion 15a and the flanged portion 15c. The body portion 15a is formed into a generally circular columnar shape, and is provided at its upper portion with a gas exit 15b. The flanged portion 15c is provided at the outer circumference of the body portion 15a. The flanged portion 15c is provided with not-shown through holes for inserting the bolts 12a of the aforementioned retainer 12 therethrough.

The pad 17 is made of a synthetic resin of a thermoplastic elastomer of an olefin or styrene group. The pad 17 is provided, as shown in FIGS. 1 to 5, with a ceiling wall portion 18 and a mounting wall portion 23. The mounting wall portion 23 is formed into a generally hexagonal shape extended downwards from the outer circumferential edge of the ceiling wall portion 18.

The portion of the ceiling wall portion 18 inside of the mounting wall portion 23 provides a portion covering the air bag 11. This portion is comprised of three door portions 20 and 21 (or 21L and 21R). These door portions 20 and 21 (or 21L and 21R) are opened when the air bag 11 expands. Around the door portions 20 and 21 (or 21L and 21R), there is formed a thin portion 19 to be broken. This to-be broken portion 19 is provided for opening the door portions 20, 21L and 21R smoothly while leaving the hinged portions 20a and 21a. When the air bag 11 expands, the door portion 20 opens forward on the hinged portion 20 at its front edge. Further, the door portions 21L and 21R open to the left and right, respectively, on the hinged portions 21a at the mounting wall portion 23 (or on the sides of the later-described thick plate portions 25L and 25R). In the ceiling wall portion 18 outside of the mounting wall portion 23, moreover, there are arranged pressure ribs 22 and reinforcing ribs (not shown). The pressure ribs 22 abut against the individual holding plate portions 38, upon which are mounted later-described horn switches 40.

Figure 3:
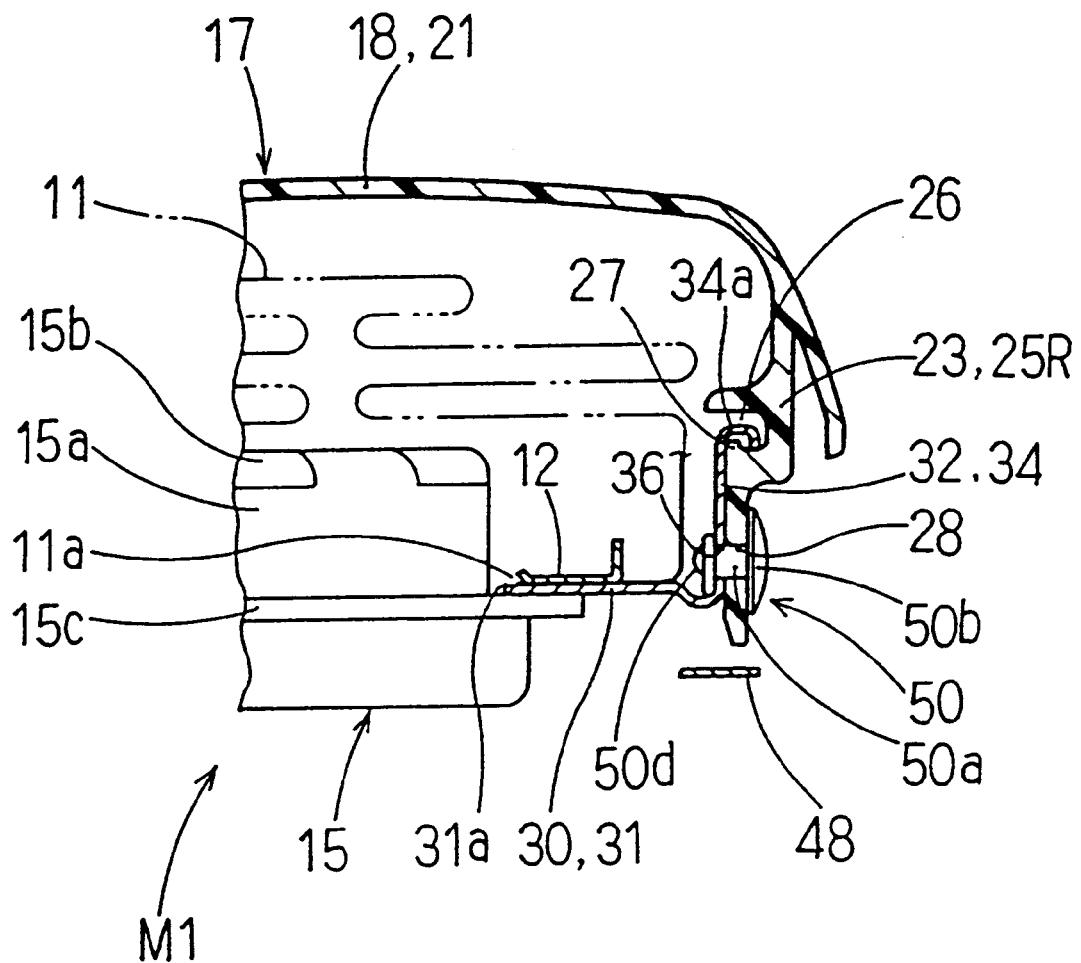
FIG. 3 is a section taken along line III—III of FIG. 1, and shows the air bag device of the embodiment.
Figure 5:
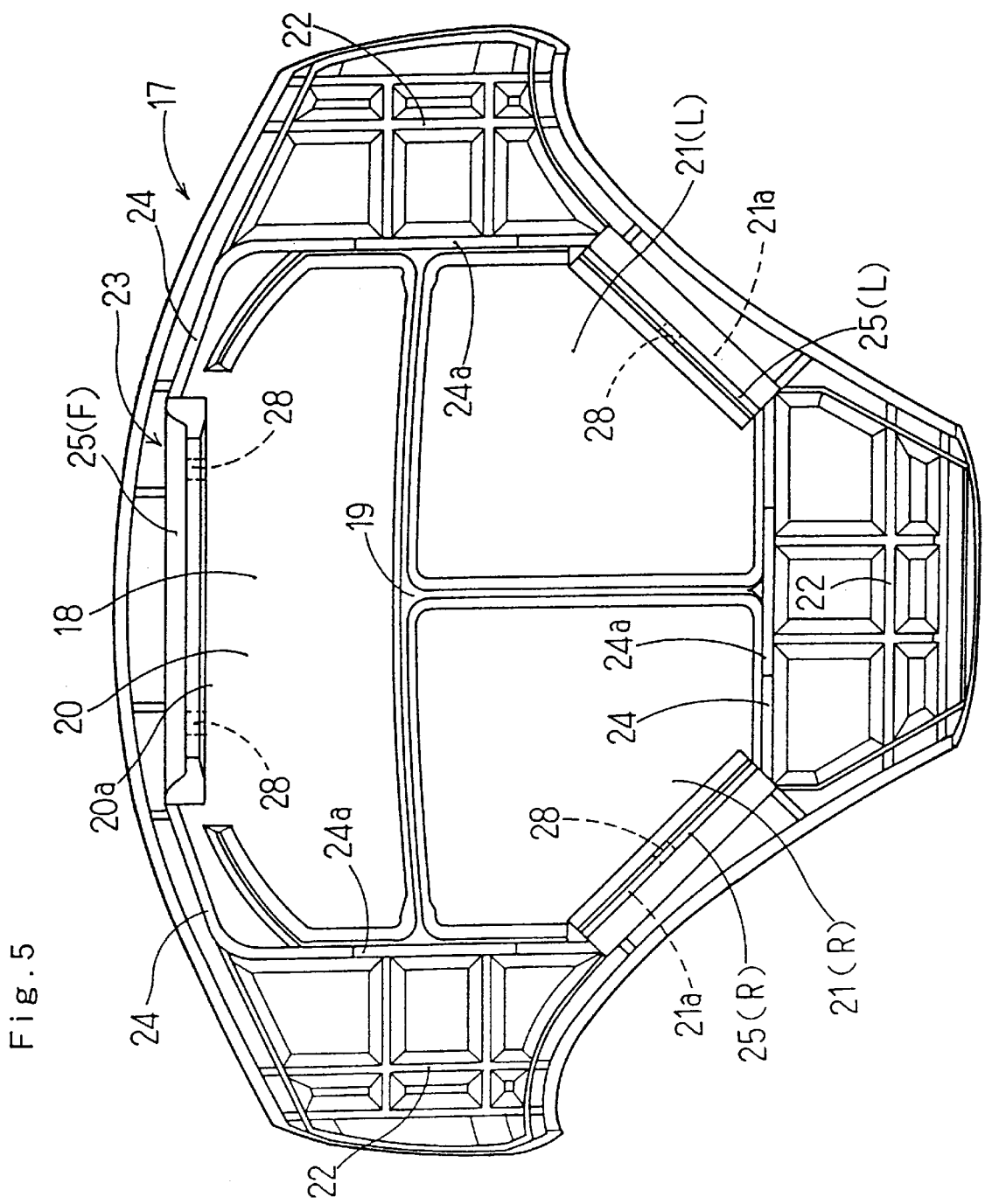
FIG. 5 is a bottom view of a pad to be used in the embodiment.
Figure 6:
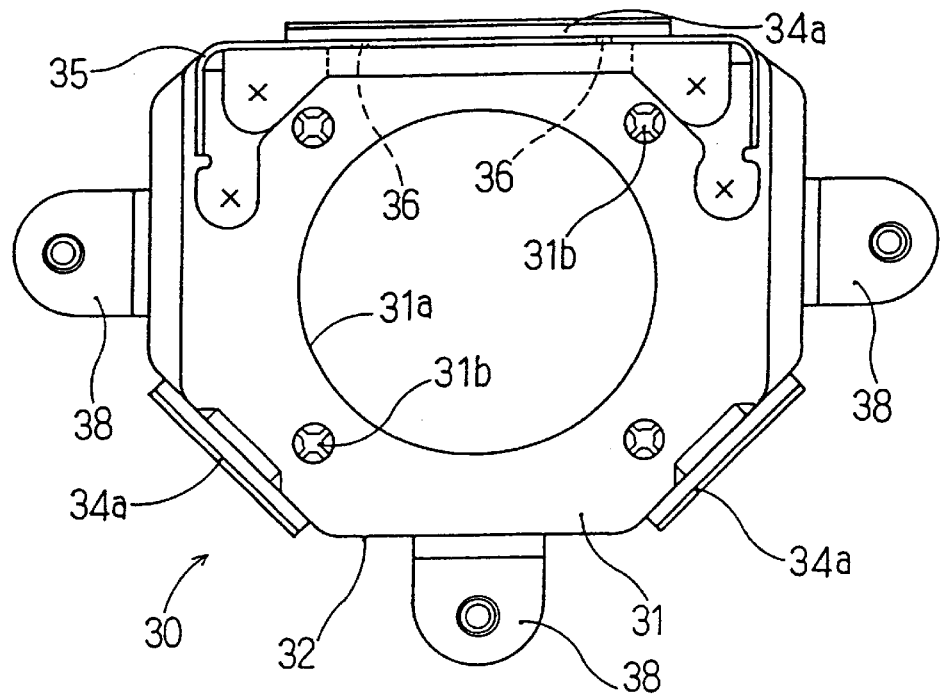
FIG. 6 is a bottom view of a bag holder to be used in the embodiment.
Figure 7:
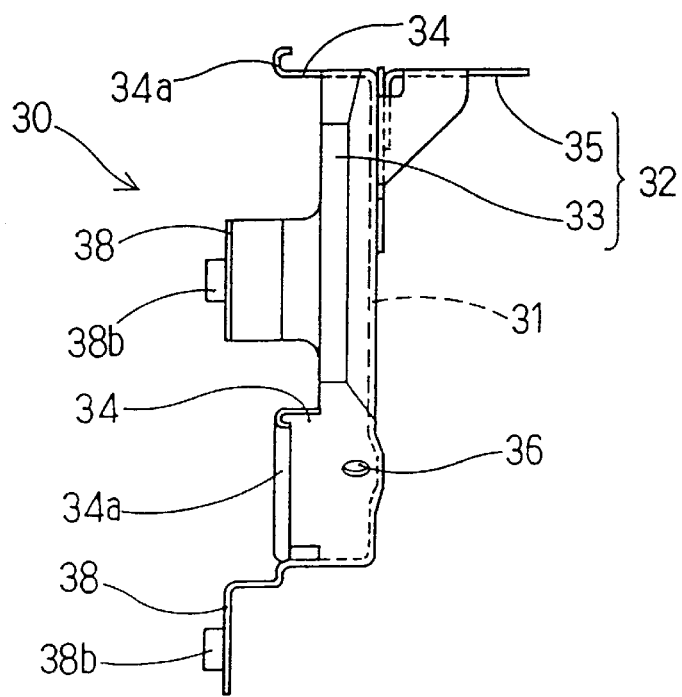
FIG. 7 is a side elevation of the bag holder of the embodiment.
Figure 8:
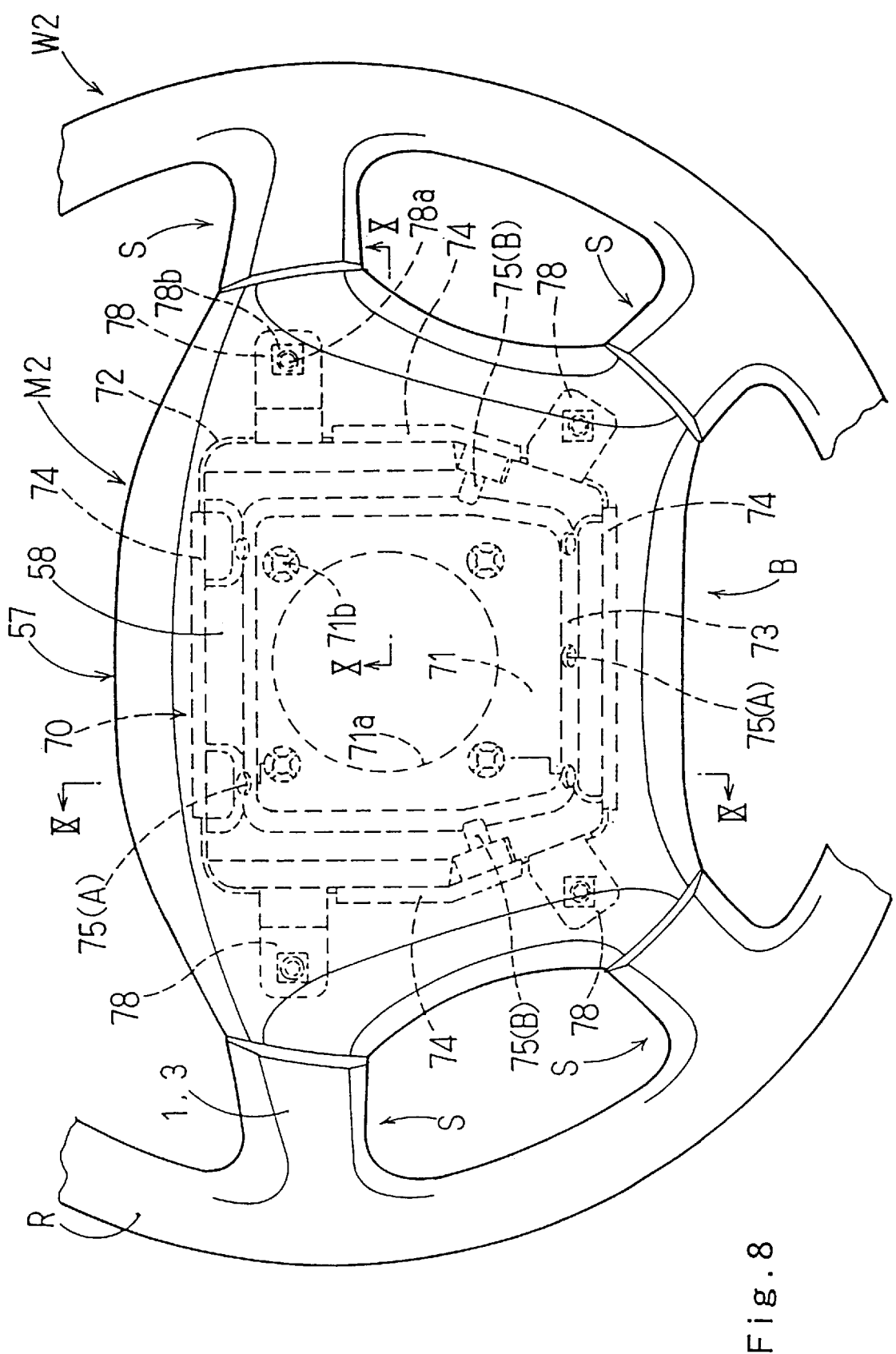
FIG. 8 is a top plan view showing a state of usage of an air bag device of a second embodiment.

The mounting wall portion 23 is comprised, as shown in FIGS. 2, 3 and 5, of thin plate portions 24 and thick plate portions 25. These thin and thick plate portions 24 and 25 are formed to be continuous. The thick plate portions 25 are comprised of the thick plate portion 25F arranged in the front, the thick plate portion 25L arranged at the lefthand side of the back, and the thick plate portion 25R arranged at the righthand side of the back. These individual thick plate portions 25 are protruded downwards from the thin plate portions 24. The individual thick plate portions 25 are provided in their inner side portions with retaining grooves 26 formed horizontally. Further provided below the retaining grooves 26 are mounting holes 28 which extend horizontally through the individual thick plate portions 25. In other words, the retaining grooves 26 are located over the mounting holes 28. Two mounting holes 28 are formed in the thick plate portion 25F, and one mounting hole 28 is formed in each of the thick plate portions 25L and 25R. On the inner edge of the inner periphery of the individual retaining grooves 26, as shown in FIGS. 2 and 3, there are formed ridges 27.

On the other hand, the thin plate portions 24 are provided at their lower end faces with recesses 24a. Into these recesses 24a, there are inserted the later-described three holding plate portions 38 of the bag holder 30.

This bag holder 30 is made of a sheet metal and is comprised of a bottom wall portion 31 and a side wall portion 32, as shown in FIGS. 1 to 3 and FIGS. 6 and 7. The bottom wall portion 31 is formed into a generally hexagonal shape. The side wall portion 32 is extended vertically from the peripheral edge of the bottom wall portion 31.

The bottom wall portion 31 is provided at its center with an insertion hole 31a which is opened in a circular shape. Into this insertion hole 31a, there is inserted upward the inflator body portion 15a. On the other hand, the bottom wall portion 31 is provided at the peripheral edge of the insertion hole 31a with the four through holes 31b. Into these through holes 31b, there are inserted the individual bolts 12a of the retainer 12.

The side wall portion 32 is comprised of an upper portion 33 and a lower portion 35. The upper side wall portion 33 is extended upward in a cylindrical shape from the outer peripheral edge of the bottom wall portion 31 so as to abut against the inner side face of the pad mounting wall portion 23. The lower side wall portion 35 is extended downward from the front edge of the bottom wall portion 31.

At the upper side wall portion 33 corresponding to the individual thick plate portions 25F, 25L and 25R of the mounting wall portion 23, moreover, there are formed upper extensions 34 which extend upwards from the bottom wall portion 31. At the upper ends of the individual upper extensions 34, there are formed retaining pawls 34a. These retaining pawls 34a are retained on the peripheral edges of the individual retaining grooves 26. In the present embodiment, the individual retaining pawls 34a are formed into an inverted J-shaped section in which they are once bent outward from the upper end of the upward extensions 34 and then turned downwards. The reason for this shape is to enable the individual retaining pawls 34a to be retained over the ridges 27 by the peripheral edges of the retaining grooves 26.

The lower side wall portion 35 is prepared by punching out a sheet of plate metal into the predetermined shape and by bending the punched metal. Moreover, the lower side wall portion 35 is welded to the bottom wall portion 31.

Moreover, the lower side wall portion 35 and the lower portion of the upward extension 34 of the upper side wall portion 33 are provided with mounting holes 36 extending horizontally therethrough. These individual mounting holes 36 are made to correspond with the mounting holes 28 of the pad mounting wall portion 23. Two mounting holes 36 are formed in the lower side wall portion 35. One mounting hole 36 is formed in each of the remaining portions.

The upper side wall portion 33 is provided at its left and right edges and back edge with the holding plate portions 38. These holding plate portions 38 are extended upwards from the edges of the upper side wall portion 33 and then extended horizontally. The individual holding plate portions 38 are provided with mounting holes 38a. Nuts 38b are fixed on the circumferential edges of the mounting holes 38a. The horn switches 40 are mounted on these individual holding plate portions 38.

Each horn switch 40 is comprised of a movable contact 41, a stationary contact 42, a coil spring 43, insulating spacers 44 and 45, and a shoulder bolt 46. The coil spring 43 urges the movable contact 41 away from the stationary contact 42. The insulating spacer 44 holds the movable contact 41. The insulating spacer 45 holds the stationary contact 42. Moreover, the insulating spacer 45 is bayonet-jointed to a supporting portion 48a of the support plate 48. The shoulder bolt 46 is used for assembling the horn switch 40. The shoulder bolt 46 also has the role of mounting the horn switch 40 together with the support plate 48 on the holding plate portion 38. In the horn switch 40, the movable contact 41 is in contact with the bag holder 30. This bag holder 30 is connected with the plus terminal of the horn activating circuit. Meanwhile, the stationary contact 42 is in contact with the support plate 48. This support plate 48 is in contact with the core 2 of the steering wheel body 1 and is connected with the minus terminal of the horn activating circuit.

The support plate 48 is made of a sheet metal and is equipped, as shown in FIG. 4, with the supporting portion 48a for supporting each horn switch 40. The individual supporting portions 48a are arranged on the lower faces of the two left and right edges of the air bag device M1 and on the lower face of the back edge. Moreover, the support plate 48 is constructed such that it connects the individual supporting portions 48a. In addition, the support plate 48 is provided near the left and right supporting portions 48a with mounting holes 48b. Into these mounting holes 48b, there are inserted not-shown bolts. By these bolts, the air bag device M1 is connected to the steering wheel body 1 at the portions of the left and right spoke portion cores 2b.

Next will be described the procedure for assembling the air bag device M1 thus constructed.

First, the retainer 12 is inserted into the air bag 11 such that the individual bolts 12a are protruded outwards from the circumferential edge of the opening 11a. Then, the air bag 11 is folded down. Next, the air bag 11 is arranged over the bottom wall portion 31 of the bag holder 30 such that the individual bolts 12a are protruded from the through holes 31b.

Next, the air bag 11 is enclosed with the pad 17. Then, the retaining pawls 34a of the bag holder 30 are retained on the peripheral edges of the individual retaining grooves 26. Moreover, the individual mounting holes 28 and 36 are aligned, and blind rivets 50 are inserted into the individual mounting holes 28 and 36 from the outer sides of the thick plate portions 25F, 25L and 25R of the pad mounting wall portion 23, and are fastened.

Then, the support plate 48 and the horn switches 40 are mounted on the individual holding plate portions 38 of the bag holder 30 by making use of the shoulder bolt 46. Thus, the air bag device M1 can be assembled. Here, the horn switches 40 and the support plate 48 may be assembled in advance with the bag holder 30.

After this, the individual mounting holes 48b of the air bag device M1 are arranged at predetermined positions with respect to the steering wheel body 1, and the bolts are fastened within the individual mounting holes 48b. Thus, the air bag device M1 can be mounted on the steering wheel body 1. At the same time, the assembly of the steering wheel W1 is completed. Here, this steering wheel body 1 is mounted in advance on the vehicle.

After this, the inflating gas is discharged from the gas exit 15b of the inflator body portion 15a so that the air bag 11 begins to expand. Then, the air bag 11 breaks the portion 19 of the pad ceiling wall portion 18 to open the door portions 20, 21 and 21. As a result, the air bag 11 bulges to a considerable extent from the pad 17.

In the air bag device M1 of the first embodiment, moreover, the retaining pawls 34a of the upper side wall portion 33 in the bag holder side wall portion 32 are retained on the peripheral edges of the retaining grooves 26 of the thick plate portions 25F, 25L and 25R in the pad mounting wall portion 23. Moreover, the blind ribs 50 are inserted as the fixing means into the mounting holes 28 and 36 of the pad mounting wall portion 23 and the back holder side wall portion 32, thereby to fasten the pad mounting wall portion 23 and the bag holder side wall portion 32. By these means, the pad 17 is held in the bag holder 30.

In the air bag device M1 of the first embodiment, more specifically, the pad 17 is held in the bag holder 30 by using the clamping type and the rivet type together. As a result, the air bag device M1 of the first embodiment is equipped with the four blind rivets 50 as the fixing means in addition to the components of the clamping type. However, the air bag device M1 is made lighter than the clamping type because the back-up plate can be omitted. As compared with the rivet type, on the other hand, the air bag device M1 of the first embodiment enables the omission of the doubling plate and a reduction of the number of the fixing means. As a result, the air bag device M1 can be made lighter than the rivet type.

Moreover, the pad 17 is held in the bag holder 30 by retaining the peripheral edges of the retaining grooves 26 with the retaining pawls 34a, and by fastening the mounting wall portion 23 and the side wall portion 32 by the rivets 50. As a result, the holding force of the pad 17 by the bag holder 30 can be prevented from being reduced by suitably setting the portions to be retained and the portions to be fastened. In the present embodiment, the mounting holes 28 to be fastened by the rivets 50 are arranged just below the portions near the retaining grooves 26 of the pad mounting wall portion 23. Thus in the first embodiment, vertical movements of the retaining grooves 26 are prevented as much as possible by the rivets 50.

As compared with the clamping type, the first embodiment can additionally use the fastening of the rivets 50 so that no trouble arises even if there is a reduction of strength of the retaining pawls 34a to be retained on the peripheral edges of the retaining grooves 26. As a result, the embodiment enables thinner retaining pawls 34a, as well as a reduction of thickness of the upper side wall portion 33 in the back holder side wall portion 32. This enables the present embodiment to provide an enlargement of the internal space. In addition, the first embodiment enables a reduction of the number of the rivets 50 as compared with the rivet type. Therefore, the first embodiment enables an enlargement the internal space of the bag holder side wall portion 32. As a result, the present embodiment permits an easy folding and accommodation even the bulky air bag 11 easily.

Thus, the air bag device M1 of the first embodiment can be made to be lighter and to have a larger internal space without a reduction of the holding force of the pad 17 by the bag holder 30.

In the first embodiment, moreover, the upper side wall portion 33 having the retaining pawls 34a in the metallic bag holder side wall portion 32 is extended upwards from the bottom wall portion 31 and arranged on the inner side face of the thick plate portions 25 in the pad mounting wall portion 32. The arrangement position of this upper side wall portion 33 is located over that of the rivets 50 acting as the fixing means. As compared with the rivet type, therefore, the first embodiment enables as introduction of the pressure of the air bag 11 at the time of expansion more smoothly to the side of the ceiling wall portion 18 by the metallic bag holder upper side wall portion 33. As a result, the first embodiment enables an improvement of the extension performances of the door portions 20, 21 and 21 of the pad ceiling wall portion 18.

In the air bag device M1 of the first embodiment, the ridges 27, as protruded upwards, are formed on the inner edges of the retaining grooves 26 in the pad mounting wall portion 23. Moreover, the leading ends of the retaining pawls 34a are formed to effect the retentions over the ridges 27 of the inner peripheries of the retaining grooves 26. As a result, the bulging of the pad mounting wall portion 23 of a synthetic resin over the bag holder side wall portion 32 can be prevented by the retentions of the ridges 27 of the retaining pawls 34a, even if the pressure of the air bag 11 at the time of expansion acts upon the pad mounting wall portion 23. Moreover, the acting pressure at the time of expansion of the air bag 11 can be smoothly introduced to the ceiling wall portion 18. As a result, the extension performances of the door portions 20, 21 and 21 of the pad ceiling wall portion 18 can be further improved.

In the first embodiment, on the other hand, the fixing means is exemplified by the blind rivets 50 to be fastened from the outer side face of the pad mounting wall portion 23. This fixing means provides no larger protrusion on the inner periphery of the bag holder side wall portion 32 than the fixing means employing the bolts and nuts. Thus, the first embodiment can provide a larger inner space within the bag holder side wall portion 32. As a result, the first embodiment enables the easy folding and accommodation even of a bulky air bag 11.

On the other hand, the first embodiment employs the blind rivets so that the air bag 11 can be prevented from being damaged even if the air bag 11 interferes with the blind rivets. Here, each blind rivet 50 is comprised of a cylindrical portion 50a and a rod portion 50c, as indicated by the double-dotted lines in FIG. 2. The cylindrical portion 50a has a flanged portion 50b. The rod portion 50c is arranged in the cylindrical portion 50a, and has a leading head portion 50d bulging into a ball shape. When the blind rivet 50 is to be used, its head portion 50d and cylindrical portion 50a are protruded into the side wall portion 32 through the mounting holes 36 and 28. Next, the rod portion 50c is pulled. Then, the cylindrical portion 50a is so elastically deformed as to bulge at the circumferential edge of the mounting hole 36a. On the other hand, the rod portion 50c is cut off at the portion that is protruded from the flanged portion 50b. As a result, the mounting wall portion 23 and the side wall portion 32 are fastened by the flanged portion 50b and the bulging cylindrical portion 50a. Here, bolts and nuts may naturally be employed as the fixing means if no consideration is made in regards to the aforementioned actions and effects.

Here will be described an air bag device M2 according to a second embodiment. This air bag device M2 is arranged over the central boss portion B in a steering wheel W2.

This steering wheel W2 is equipped with the four spoke portions S. What is different from the first embodiment is the shapes of a pad 57, a bag holder 70 and support plates 88. The remaining members are substantially similar to those of the first embodiment, excepting that the steering wheel body 1 is equipped with the four spoke portions S. Therefore, the description of the identical members will be omitted by designating these with identical the common reference numerals.

The pad 57 is made, as in the first embodiment, of a synthetic resin of a thermoplastic elastomer of an olefin or styrene group. The pad 57 is provided, as shown in FIGS. 8 to 12, with a ceiling wall portion 58 and a mounting wall portion 63. The mounting wall portion 63 is formed into a generally square cylindrical shape extended downwards from the outer circumferential edge of the ceiling wall portion 58.

The portion of the ceiling wall portion 58 inside of the mounting wall portion 63 provides a portion covering the air bag 11. This inside portion is provided with two door portions 60 and 61, to be opened when the air bag 11 expands. The door portions 60 and 61 are enclosed by a thin portion 59 to be broken, which has a generally H-shaped top plan shape. When the air bag 11 expands, the door portion 60 is opened forward on a hinged portion at its front edge side. Conversely, the door portion 61 is opened backwards on a hinged portion 61a at its back edge side. In the ceiling wall portion 58 outside of the mounting wall portion 63, moreover, there are arranged pressure ribs 62 and reinforcing ribs (although not shown). The pressure ribs 62 are formed into a cylindrical shape to abut against the later-described individual holding plate portions 78 which have the horn switches 40 mounted thereon.

Figure 9:
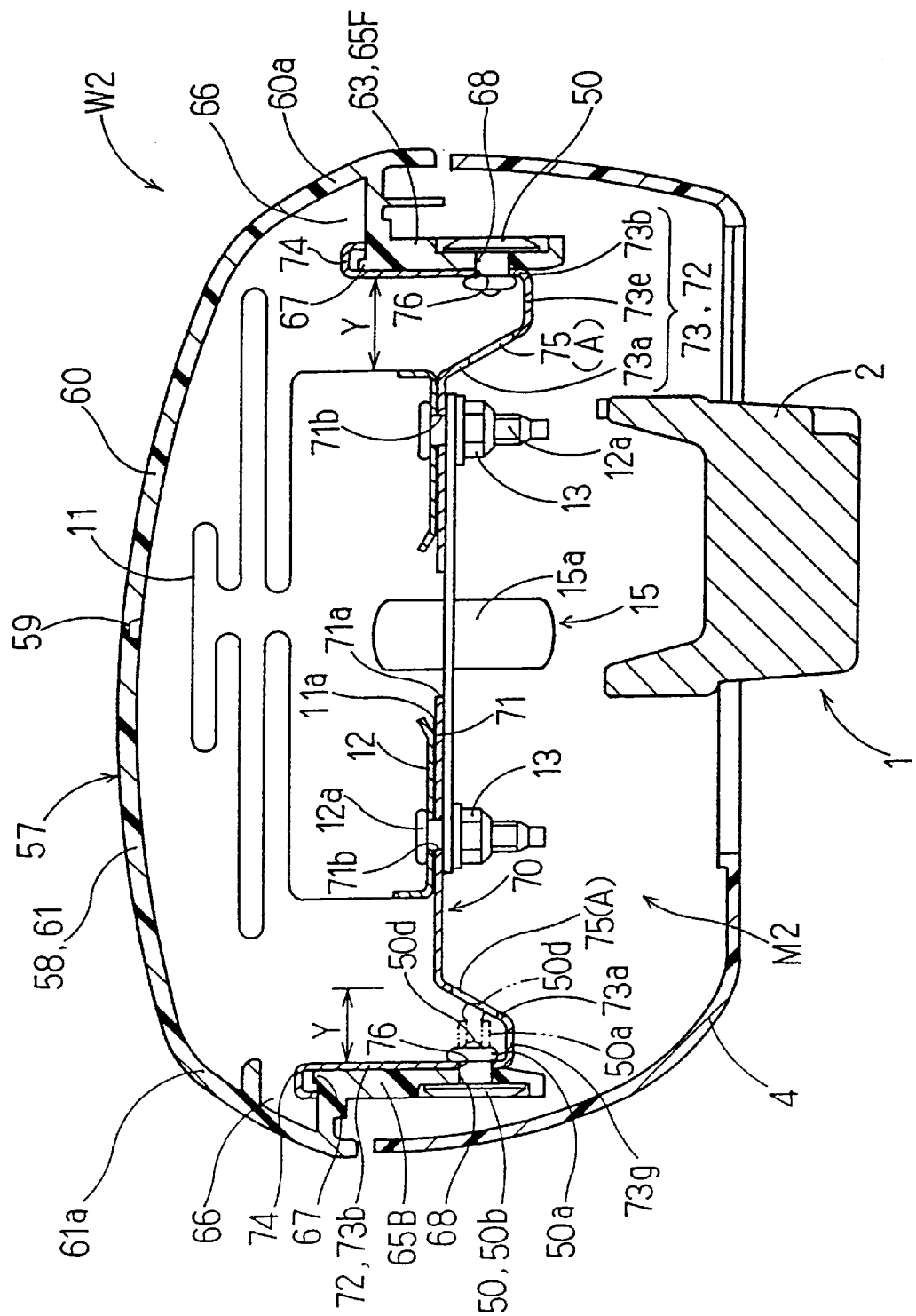
FIG. 9 is a section taken along line IX—IX of FIG. 8.
Figure 10:
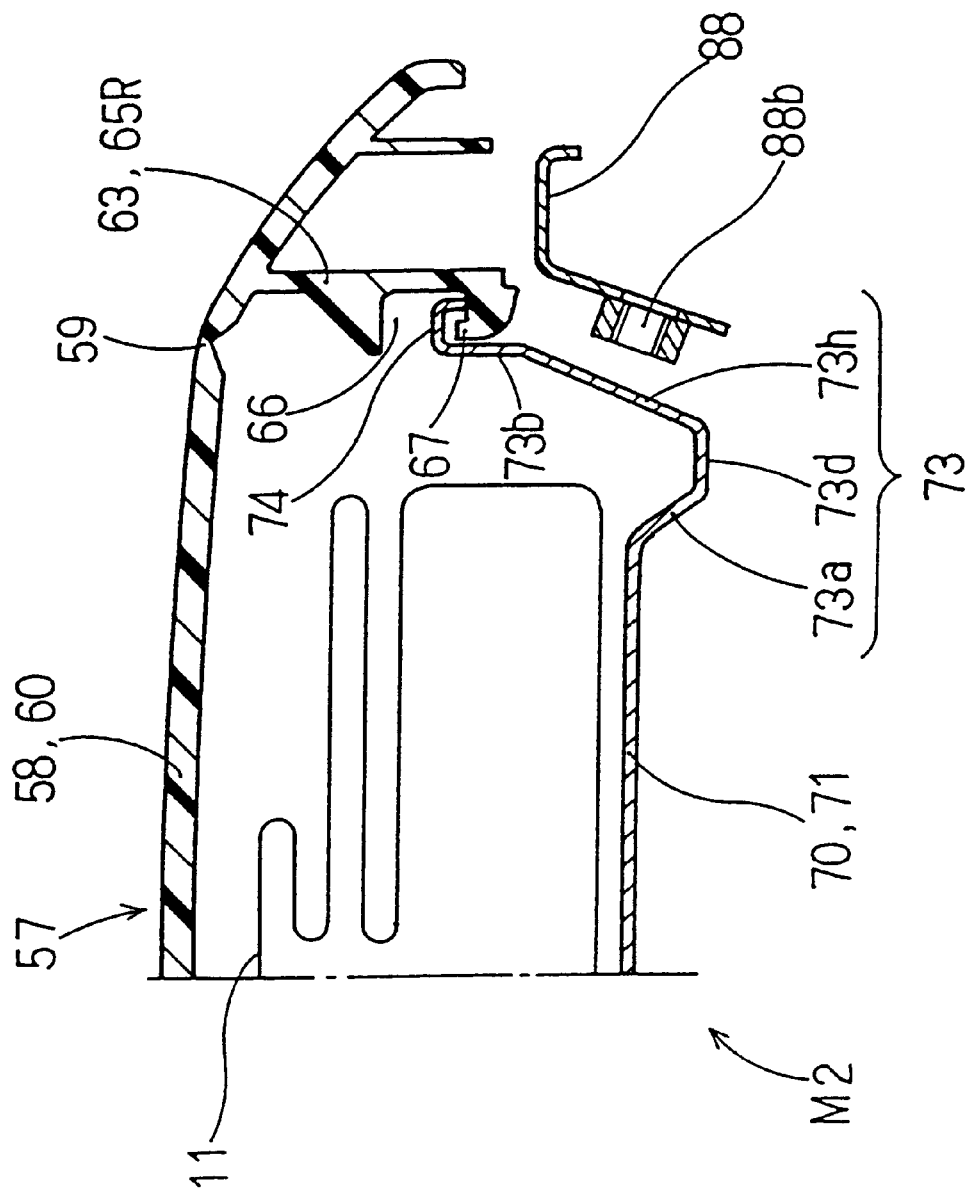
FIG. 10 is a section taken along line X—X of FIG. 9 and showing the air bag device of the embodiment.
Figure 11:
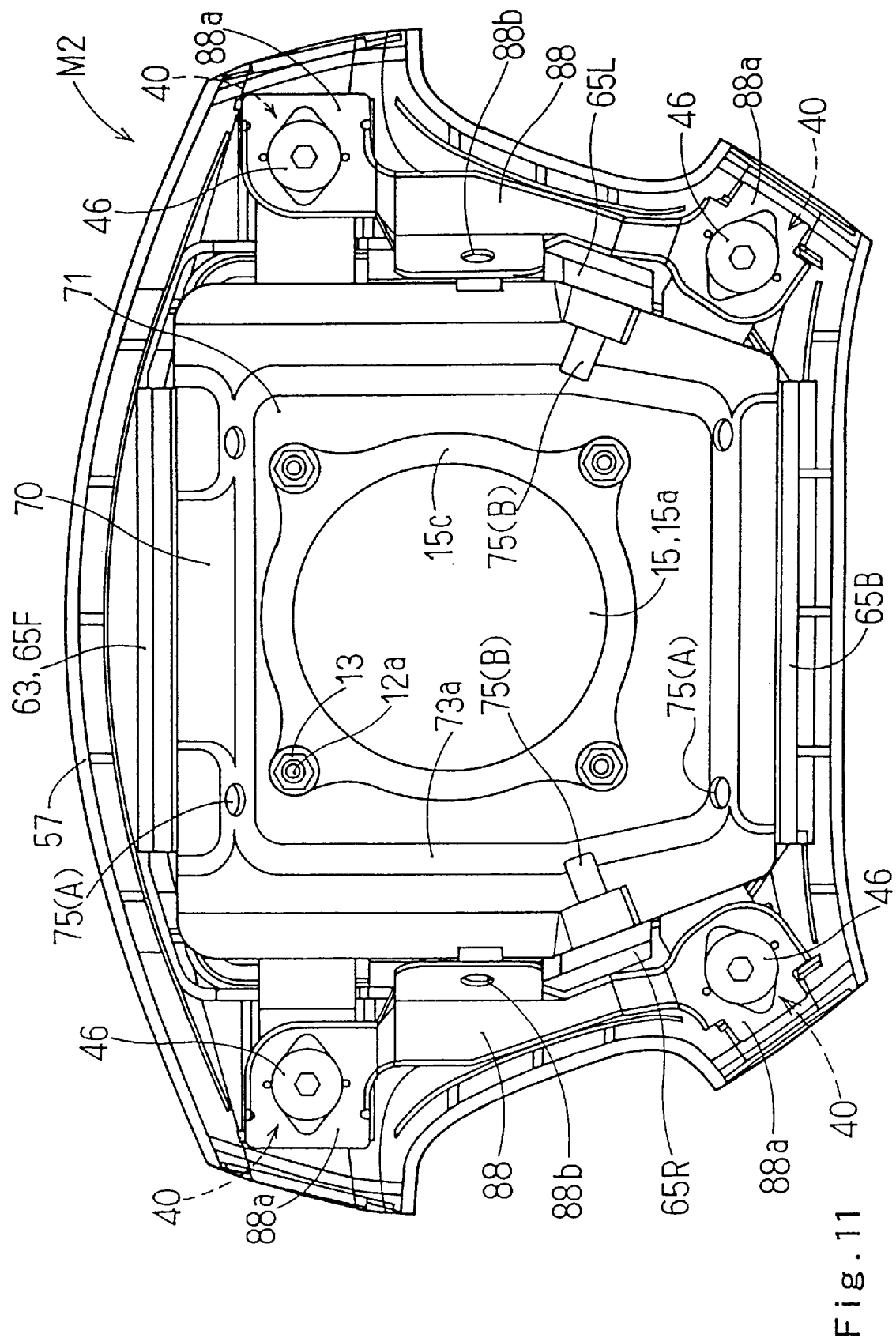
FIG. 11 is a bottom view of the air bag device of the embodiment.
Figure 12:
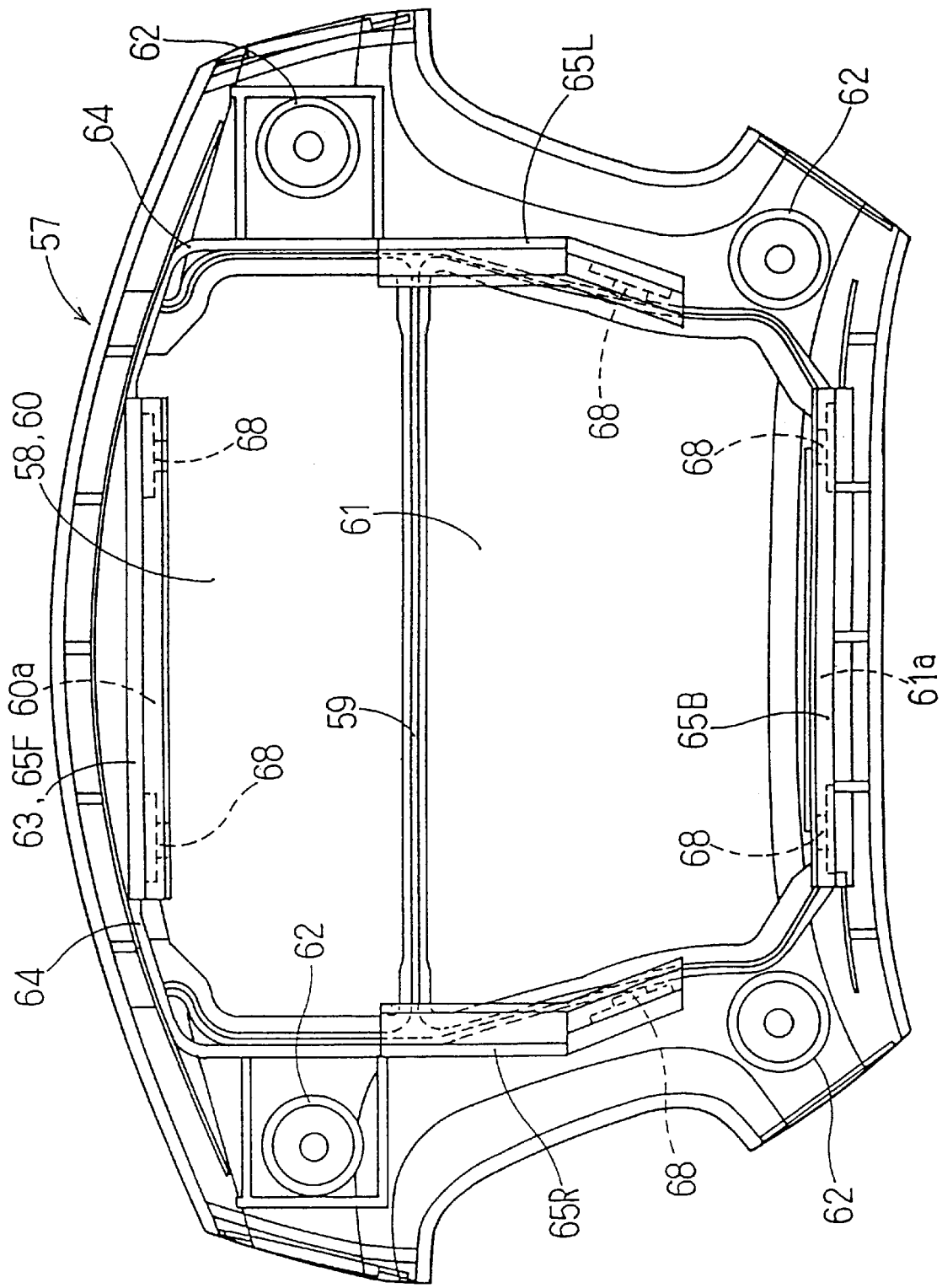
FIG. 12 is a bottom view of a pad to be used in the embodiment.
Figure 13:
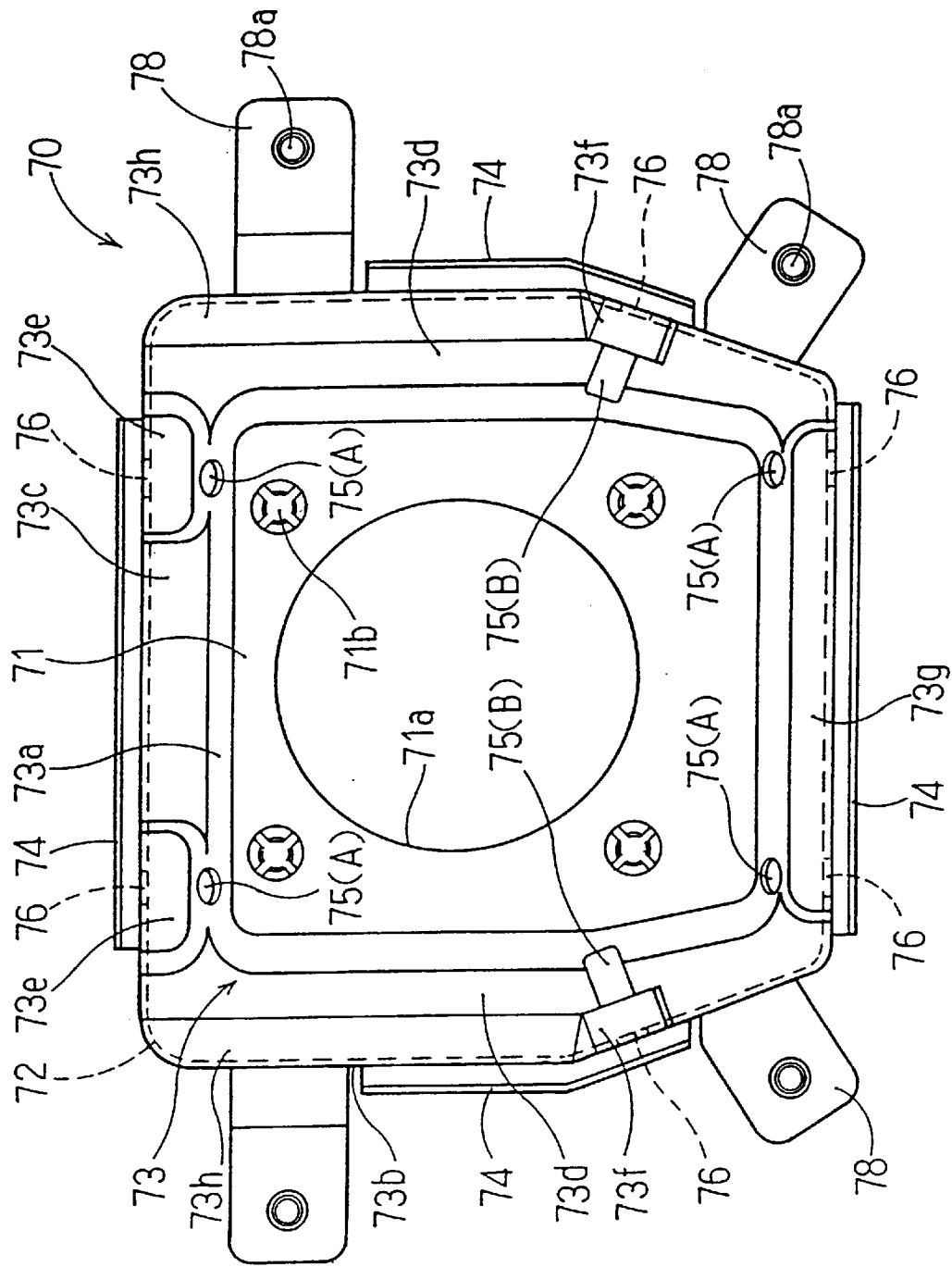
FIG. 13 is a bottom view of a bag holder to be used in the embodiment.
Figure 14:
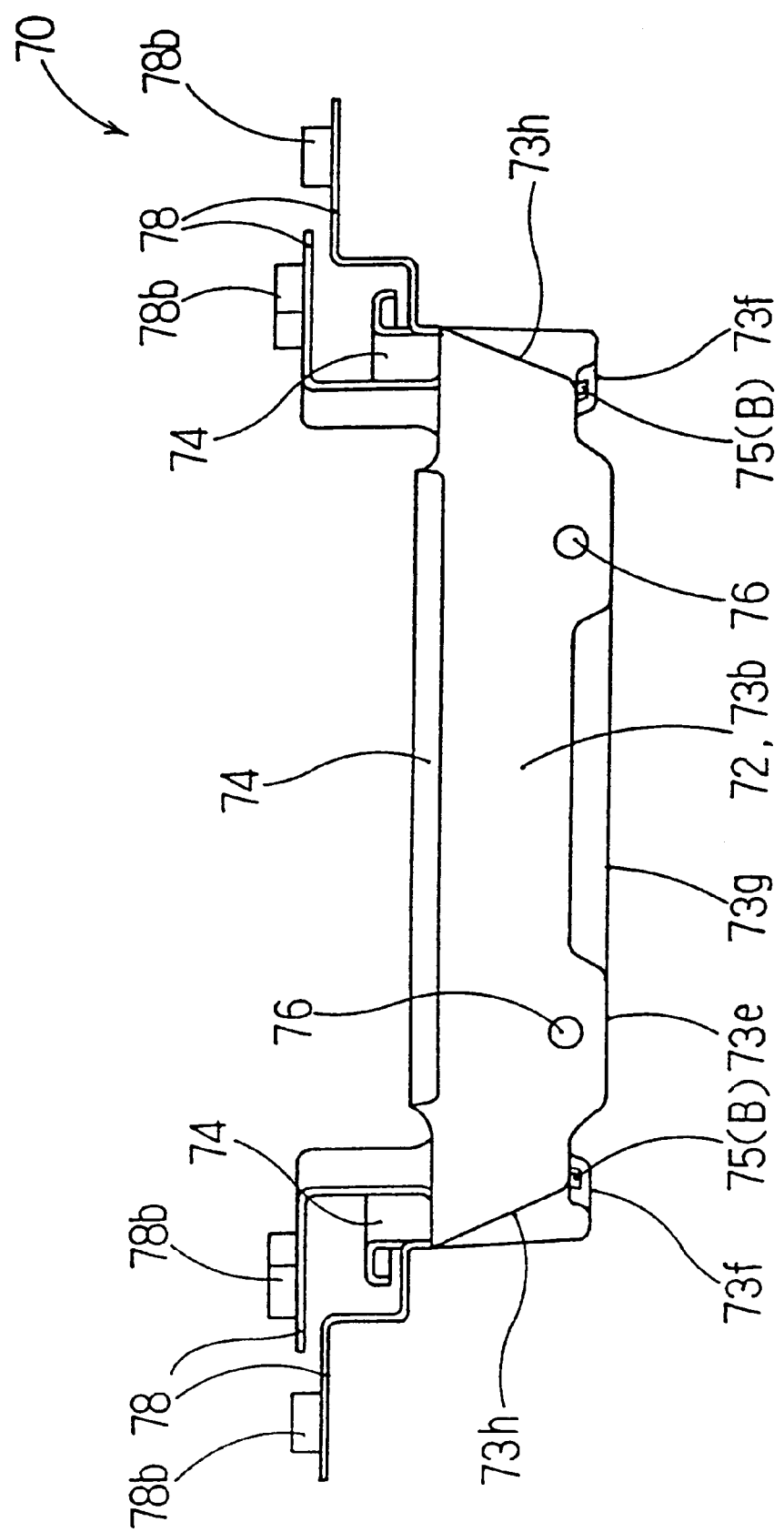
FIG. 14 is a back elevation of the bag holder of the embodiment.

The mounting wall portion 63 is comprised, as shown in FIGS. 9, 10 and 12, of thin plate portions 64 and thick plate portions 65. These thick plate portions 65 are comprised of thick plate portions 65F, 65B, 65L and 65R, which are arranged at the front and back and at the lefthand and righthand, respectively. The thick plate portions 65F, 65B, 65L and 65R are provided in their inner side faces with retaining grooves 66, which are formed in the horizontal direction. The thick plate portions 65F, 65B, 65L and 65R are further provided below the retaining grooves 66 with mounting holes 68 which extend therethrough in the horizontal directions. The thin plate portions 64 are formed to connect the left and right thick plate portions 65L and 65R and the front thick plate portion 65F. The individual mounting holes 68 in the outer side faces of the mounting wall portions 63 are provided at their circumferential edges with recesses which can arrange the flanged portions 50b of the blind rivets 50. On the other hand, two mounting holes 68 are individually formed in the front and back thick plate portions 65F and 65B. One mounting hole 68 is individually formed in the left and right thick plate portions 65L and 65R. Moreover, ridges 67 are formed on the inner edges of the inner peripheral faces of the individual retaining grooves 66, as shown in FIGS. 9 and 10.

This bag holder 70 is made of a sheet metal, and is comprised of a bottom wall portion 71 of a generally square plate shape and a side wall portion 72, as shown in FIGS. 9 to 11 and FIGS. 13 and 14. The side wall portion 72 is extended vertically from the peripheral edge of the bottom wall portion 71.

The bottom wall portion 71 is provided at its center with an insertion hole 71a which is opened in a circular shape. Into this insertion hole 71a, there is inserted upwards the inflator body portion 15a. On the other hand, the bottom wall portion 71 is provided at the peripheral edge of the insertion hole 71a with four through holes 71b into which the individual bolts 12a of the retainer 12 can be inserted.

The side wall portion 72 is constructed to have a U-shaped portion 73. This U-shaped portion 73 is shaped by bending it downwards from the outer peripheral edge of the bottom wall portion 71, and by extending it upwards to abut against the inner side face of the pad mounting wall portion 63. This U-shaped portion 73 is comprised of an inner side wall portion 73a and an outer side wall portion 73b. The inner side wall portions 73a are extended obliquely downwards from the outer peripheral edge of the bottom wall portion 71 to the outside. The outer side wall portion 73b is extended upwards in to a generally square cylinder at its outside. Between the inner side wall portions 73a and the outer side wall portions 73b, there are arranged bottom portions 73c, 73d, 73e, 73f and 73g. Of these bottom portions, the two bottom portions 73e at the front, the bottom portions 73f at the lefthand and righthand sides, and the bottom portion 73g at the back are located at the lowermost positions and in parallel with the bottom wall portion 71. Moreover, the front bottom portion 73c and the left and right bottom portions 73d are arranged in parallel with the bottom wall portion 71, and set at a middle level between the bottom wall portion 71 and the bottom portions 73e, 73f and 73g. A portion, as designated by reference numeral 73h, is a connecting portion which is obliquely extended.

Within the portions, as corresponding to the individual thick plate portions 65F, 65B, 65L and 65R of the pad mounting wall portion 63 of the outer side wall portion 73b above the bottom wall portion 71, there are formed retaining pawls 74. These retaining pawls 74 can be retained on the peripheral edges of the retaining grooves 66 over the ridges 67. On the other hand, the outer wall portion 73b is provided under the retaining pawls 74 with mounting holes 76 which are extended therethrough in the horizontal directions so as to correspond to the mounting holes 68 of the pad mounting wall portion 63. At the edges near the four corners of the outer wall portion 73b, moreover, there are formed the holding plate portions 78 which are extended upwards and then horizontally. The holding plate portion 78 at the front side extends in a step-like shape. The individual holding plate portions 78 are provided with mounting holes 78a, which fix nuts 78b on their circumferential edges. Into these mounting holes 78a, there are inserted the shoulder bolts 46 for mounting the horn switches 40.

In the second embodiment, moreover, the inner side wall portions 73a of the bag holder 70 are provided with through holes 75 on the extensions of the mounting holes 76. The through holes 75 prevent any interference between the inner side wall portion 73a and the rivets 50. Two through holes 75A, as individually formed in the front and back inner side wall portions 73a, are opened in a circular shape. Through holes 75B, as formed in the left and right inner side wall portions 73a, are opened in a shape extended not only in the inner side wall portions 73a, but also to the bottom portion 73d.

The procedure for assembling this air bag device M2 is made to be identical to that of the air bag device M1. Specifically, first, the retainer 12 is inserted into the air bag 11, and this air bag 11 is folded. Next, this folded air bag 11 is arranged on the bottom wall portion 71 of the bag holder 70 such that the individual bolts 12a are protruded from the through holes 71b. Then, the air bag 11 is covered with the pad 57, and the retaining pawls 74 of the bag holder 70 are retained on the peripheral edges of the individual retaining grooves 66. Moreover, the mounting holes 68 and 76 are aligned, and the blind rivets 50 are inserted from the outside of the thick plate portions 65F, 65B, 65L and 65R of the pad mounting wall portion 63 into the individual mounting holes 68 and 76, and are then fastened. Moreover, not only the support plates 88 but also the horn switches 40 are mounted on the individual holding plate portions 78 of the bag holder 70 by making use of the shoulder bolts 46. As a result, the air bag device M2 can thus be assembled.

Here, the horn switches 40 and the support plates 88 may be assembled in advance with the bag holder 70. Here, the support plates 88 of the embodiment are provided at the two left and right portions of the air bag device M2. Moreover, the front and back ends of the support plates 88 act as portions 88a for supporting the horn switches 40. On the other hand, the support plates 88 are provided at their intermediate portions with mounting holes 88b, through which the support plates 88 are mounted on the steering wheel body 1 by means of bolts.

The air bag device M2 of the second embodiment can achieve actions and effects similar to those of the first embodiment.

Moreover, the side wall portion 72 of the bag holder 70 is provided with a portion having a U-shaped section which is extended downwards from the outer peripheral edge of the bottom wall portion 71, and then upwards. The outer side wall portion 73b of the U-shaped portion 73 is provided with the mounting holes 76 below the bottom wall portion 71. The rivets 50 are arranged below the bag holder bottom wall portion 71 for holding the air bag on its upper face side. Moreover, the rivets 50 are arranged in the grooved U-shaped portion 73. This arrangement can prevent the folded air bag 11 from being nipped by the rivets 50 when the rivets 50 are fastened.

In the second embodiment, moreover, the inner side wall portions 73a of the U-shaped portion 73 are provided with the through holes 75, which are formed on the extensions of the mounting holes 76 for preventing any interference with the heads 50d (as indicated by the double-dotted lines in FIG. 9) of the rivets 50. This enables a further reduction of the width Y of the groove-shaped U-shaped portion 73. As a result, the folded air bag 11 can be made such that it is difficult for it to enter the U-shaped portion 73, so that the air bag 11 can be further prevented from being nipped by the rivets 50 that are being fastened.

What is claimed is:

1. An air bag device including a pad, made of a synthetic resin, and a bag holder, the device comprising:

the pad having a top wall covering a folded air bag, a door adapted to be broken when the air bag is deployed, and at least one unitary mounting wall extending downwardly from the outer peripheral edge of the top wall;

the at least one unitary mounting wall comprising:

a plurality of spaced apart mounting holes positioned to extend horizontally and a retaining groove arranged horizontally in the inner side surface thereof above the plurality of spaced apart mounting holes;

the bag holder comprising:

a bottom wall, arranged under and spaced from the top wall with the air bag located on an upper surface thereof, and a side wall extending vertically from an outer peripheral edge of the bottom wall, the side wall being operatively connected to the at least one unitary mounting wall;

wherein the side wall comprising:

a plurality of mounting holes extending therethrough and positioned to correspond to the plurality of mounting holes in the at least one unitary mounting wall, and a retaining pawl capable of being retained within the retaining groove provided in the at least one unitary mounting wall;

wherein the pad is held on the bag holder by the interconnection between the retaining pawl and the retaining groove and by inserting fasteners into the mounting holes in the at least one unitary mounting wall and the side wall to fasten the at least one unitary mounting wall to the side wall so that:

the side wall abuts against the inner side surface of the at least one unitary mounting wall and only the fasteners abut against the outer side surface of the at least one unitary mounting wall; and only the at least one unitary mounting wall and the side wall are fastened together where the at least one unitary mounting wall and the side wall are fastened by the fasteners.

2. An air bag device according to claim 1, wherein:

a retaining pawl is arranged at a position extending upwardly from the bottom wall.

3. An air bag device according to claim 2, wherein:

the retaining groove having inner edges including ridges that protrude upwardly; and the retaining pawls having leading ends that retain over the ridges of the retaining grooves.

4. An air bag device according to claim 2 or 3, wherein:

the side wall portion of the bag holder provided having a U-shaped section extending downwardly from the outer peripheral edges of the bottom wall and then upwardly, such that the mounting holes are formed in the outer side wall of said U-shaped section below the bottom wall.

5. An air bag device according to claim 4, wherein:

an inner side wall of said U-shaped section provided with holes extending therethrough and positioned to correspond with the plurality of mounting holes in the unitary mounting wall to provide a clearance for the fasteners.

6. An air bag device according to claims 2 or 3, wherein:

the fasteners comprises blind rivets to be fastened from the outer side surface of the unitary mounting wall.

7. An air bag device according to claim 4, wherein:

the fasteners comprise blind rivets to be fastened from the outer side surface of the unitary mounting wall.

8. An air bag device according to claim 5, wherein:

the fasteners comprise blind rivets to be fastened from the outer side surface of the unitary mounting wall.

9. An air bag device according to claim 7, wherein:

the side wall having an upper side portion extending upwardly from the bottom wall and a lower side portion extending downwardly from the upper side portion; and the upper side portion having the retaining pawl.

* * * * *